(12) United States Patent
Arcella et al.

(10) Patent No.: US 6,576,100 B2
(45) Date of Patent: Jun. 10, 2003

(54) FLUORINATED IONOMERS

(75) Inventors: Vincenzo Arcella, Milan (IT); Alessandro Ghielmi, Milan (IT); Marco Apostolo, Novara (IT); Julio Abusleme, Varese (IT)

(73) Assignee: Ausimont S.p.A., Milan (IT)

( * ) Notice: Subject to any disclaimer, the term of this patent is extended or adjusted under 35 U.S.C. 154(b) by 76 days.

(21) Appl. No.: 09/885,921

(22) Filed: Jun. 22, 2001

(65) Prior Publication Data

US 2002/0014405 A1 Feb. 7, 2002

(30) Foreign Application Priority Data

Jun. 23, 2000 (IT) ...................................... MI2000A1416

(51) Int. Cl.$^7$ ............................................... C25B 13/00
(52) U.S. Cl. ................. 204/296; 204/416; 204/421; 429/30; 429/33; 521/27; 521/28; 521/31; 252/500; 252/62.2
(58) Field of Search ............................... 429/30, 33, 27, 429/41, 46; 521/27, 28, 31; 252/500, 62.2; 204/296, 415, 421

(56) References Cited

U.S. PATENT DOCUMENTS

| | | | |
|---|---|---|---|
| 4,035,565 A | 7/1977 | Apotheker et al. | 526/249 |
| 4,243,770 A | 1/1981 | Tatemoto et al. | 525/331 |
| 4,564,662 A | 1/1986 | Albin | 526/247 |
| 4,694,045 A | 9/1987 | Moore | 525/276 |
| 4,745,165 A | 5/1988 | Arcella et al. | 526/247 |
| 4,789,717 A | 12/1988 | Giannetti et al. | 526/209 |
| 4,864,006 A | 9/1989 | Giannetti et al. | 526/209 |
| 4,940,525 A | 7/1990 | Ezzell et al. | 204/252 |
| 4,943,622 A | 7/1990 | Naraki et al. | 526/206 |
| 5,173,553 A | 12/1992 | Albano et al. | 526/238 |
| 5,595,676 A | 1/1997 | Barnes et al. | 252/62.2 |

FOREIGN PATENT DOCUMENTS

| | | |
|---|---|---|
| EP | 0 136 596 A2 | 4/1985 |
| EP | 0 199 138 A2 | 10/1986 |
| EP | 0 219 065 A2 | 4/1987 |
| EP | 0 410 351 A1 | 1/1991 |
| EP | 0 661 304 B1 | 7/1995 |

*Primary Examiner*—Bruce F. Bell
(74) *Attorney, Agent, or Firm*—Arent Fox Kintner Plotkin & Kahn

(57) ABSTRACT

Crosslinked sulphonic fluorinated ionomers having an equivalent weight 380–1300 g/eq, comprising:

(A) monomeric units deriving from one or more fluorinated monomers containing at least one ethylene unsaturation;

(B) fluorinated monomeric units containing sulphonyl groups —$SO_2F$ in an amount such as to give the above indicated equivalent weight.

17 Claims, No Drawings

FLUORINATED IONOMERS

The present invention relates to sulphonic fluorinated ionomers suitable for the preparation of membranes working from room temperature to high temperatures, of the order of 120° C.–180° C., in electrolytic applications, for example in fuel cells.

Specifically, the invention relates to sulphonic fluorinated ionomers crosslinked without involving the —$SO_2F$ groups and capable to maintain a high degree of hydration, both at room and at high temperature (up to 120°–180° C.), without substantially compromising the physical integrity of the membrane.

More specifically, in the case of crosslinked sulphonic fluorinated ionomers and having a low equivalent weight, lower than about 750, the obtained membranes show a high capability of water absorption, both at room and at high temperature (up to 120°–180° C.), without substantially compromising the physical integrity of the membrane.

In the case of sulphonic fluorinated ionomers having an equivalent weight higher than about 750 and up to about 1,300, by the crosslinking of the invention it is possible to prepare membranes having an extremely thin thickness, for example in the range 10–80 μm, which maintain a good hydration also at high temperatures, of the order of 120° C.–180° C., still maintaining the physical integrity.

BACKGROUND OF THE INVENTION

It is known in the prior art the use of the class of polymers called by the term "ionomers" in electrochemical applications, such as for example in fuel cells, chloro-alkali cells, lithium batteries, electrodialysis and in reactors in which the ionomer acts as a solid catalyst. These applications imply the contact of the ionomer with an aqueous or polar liquid having affinity with the ionic functional groups of the ionomer.

Generally, the larger the amount of sulphonic groups (ionomers having a low equivalent weight), the better the efficiency of the ionomer in the application, both in terms of ion exchange capability in electrochemical applications, and in terms of the catalyst activity in catalysis applications. From this point of view, an important parameter is the equivalent weight of the ionomer. The lower the equivalent weight, the higher the percentage of ionic groups. Therefore, ionomers having a low equivalent weight are desirable since they give a higher efficiency in the application.

In electrochemical applications, for example in fuel cells, there is a direct correlation between the ionomer conductivity and the retention of water of the ionomer. The ionic conductivity of the polymer, besides being increased by the higher presence of ionic groups in the polymer, results increased, within certain limits, also by the larger amount of water that the polymer is capable to keep (swelling degree). However, the excessive affinity of the ionomer with water has the drawback of an excessive swelling of the ionomer, which takes a gelatinous state thus losing its physical integrity. The ionomer therefore becomes completely unusable in all the applications wherein it is required under a solid form.

Also in the applications wherein the ionomer is mixed with or deposited on a support material, suitable to guarantee the form and the physical integrity of the final membrane, the ionomer must however show a sufficient physical consistency to prevent the release from the support and it must be quite insoluble in water with which it comes into contact during the use. Besides, the ionomer/membrane must be activated before the use, wherefore the chemical transformation of the precursor groups —$SO_2F$ into the corresponding ionic groups —$SO_3H$ is necessary. The membrane activation is carried out first by contacting it with an alkaline aqueous solution and then with an acid solution. During this transformation phase, if the ionomer has a high swelling degree, it can partially or completely dissolve in the reaction medium. At this point, it is extremely difficult to recover the ionomer and separate it from the by-products of the transformation reaction.

In the prior art, to obtain a limited hydration of the ionomer and sufficient physical integrity, polymers having a high equivalent weight, of the order of 1,000–1,200, i.e. having a low concentration of sulphonic groups, are used. Ionomers having a high equivalent weight absorb a limited amount of water, which guarantees the polymer insolubility. On the other hand, having few ionic groups, they have the drawback to give membranes with a low ionic conductivity during the application. An example of said membranes is represented by the commercial product NAFION®, used in fuel cells. These membranes to have a good physical integrity must however have a high thickness, generally higher than 100 μm. Besides, if these membranes are used at temperatures higher than 100° C., the water contained in the membrane, due to the limited number of hydrophilic groups —$SO_3H$ and the high thickness, tends to diminish, wherefore the membrane tends to dehydrate and the membrane conductivity is drastically reduced. Consequently, the NAFION® membranes are not effectively usable at temperatures higher than 100° C.

U.S. Pat. No. 4,940,525 describes sulphonic ionomers having a low equivalent weight, lower than 725, used to obtain unsupported thick membranes for fuel cells, only if the hydration product of the polymer is lower than 22,000. According to this patent so low hydration values are indeed necessary to maintain the polymer physical integrity at equivalent weights lower than 725, provided that the equivalent weight is not lower than 500 (col. 6, 8–16). In this patent no mention is made either to the behaviour of these membranes at high temperatures, up to about 120° C.–180° C., or to the minimum usable thickness maintaining the physical integrity.

The need was therefore felt to have available sulphonic fluorinated ionomers able to give membranes usable both at room and at high temperature (up to 120°–180° C.), without substantially compromising the physical integrity of the ionomeric membrane for sulphonic fluorinated ionomers having a low equivalent weight, lower than 750; in the case of sulphonic fluorinated ionomers having an equivalent weight higher than about 750 and up to about 1,300, to have membranes having an extremely thin thickness, for example in the range 10–80 μm.

The Applicant has surprisingly and unxpectedly found sulphonic fluorinated ionomers able to solve the above mentioned technical problem.

SUMMARY OF THE INVENTION

An object of the present invention are crosslinked sulphonic fluorinated ionomers, where crosslinking does not involve the —$SO_2F$ groups, having an equivalent weight 380–1,300 g/eq, and comprising:

(A) monomeric units deriving from one or more fluorinated monomers containing at least one ethylene unsaturation;

(B) fluorinated monomeric units containing sulphonyl groups —$SO_2F$ in an amount such as to give the above equivalent weight.

The fluorinated monomers of type (A) are selected from:
vinylidene fluoride (VDF);

$C_2$–$C_8$ perfluoroolefins, preferably tetrafluoroethylene (TFE);

$C_2$–$C_8$ chloro- and/or bromo- and/or iodo-fluoroolefins, such as chlorotrifluoroethylene (CTFE) and bromotrifluoroethylene;

$CF_2$=$CFOR_f$ (per)fluoroalkylvinylethers (PAVE), wherein $R_f$ is a $C_1$–$C_6$ (per)fluoroalkyl, for example trifluoromethyl, bromodifluoromethyl, pentafluoropropyl;

$CF_2$=CFOX perfluoro-oxyalkylvinylethers, wherein X is a $C_1$–$C_{12}$ perfluoro-oxyalkyl having one or more ether groups, for example perfluoro-2-propoxy-propyl.

The fluorinated monomers of type (B) are selected from one or more of the following:

$F_2C$=CF—O—$CF_2$—$CF_2$—$SO_2F$;

$F_2C$=CF—O—[$CF_2$—CXF—O]$_n$—$CF_2$—$CF_2$—$SO_2F$ wherein X=Cl,F or $CF_3$; n=1–10

$F_2C$=CF—O—$CF_2$—$CF_2$—$CF_2$—$SO_2F$ $F_2C$=CF—Ar—$SO_2F$ wherein Ar is an aryl ring.

Optionally the sulphonic fluorinated ionomers of the invention can contain from 0.01 to 5% by moles of monomeric units deriving from a bis-olefin of formula:

$$R_1R_2\ C=CH-(CF_2)_m-CH=CR_5R_6 \qquad (I)$$

wherein:

m=2–10, preferably 4–8;

$R_1$, $R_2$, $R_5$, $R_6$, equal to or different from each other, are H or $C_1$–$C_5$ alkyl groups.

The introduction as comonomer of the bis-olefin of formula (I), having a number of unsaturations higher than the unit, is advantageous since said comonomer has the function to pre-crosslink the ionomer in the polymerization step. The introduction of the bis-olefin has the advantage to increase the length of the primary chains which will form the final network.

Preferably the sulphonic fluorinated ionomers of the present invention are crosslinked by peroxidic route, wherefore they must contain radical attack sites in the chain and/or in the terminal position of the macromolecules, for example iodine and/or bromine atoms.

Preferably the crosslinked fluorinated sulphonic ionomers of the invention comprise:

monomeric units deriving from TFE;

monomeric units deriving from $CF_2$=CF—O—$CF_2CF_2SO_2F$;

monomeric units deriving from the bis-olefin of formula (I).

iodine atoms in terminal position.

As regards the introduction in the chain of said iodine and/or bromine atoms, it can be carried out by addition, in the reaction mixture, of brominated and/or iodinated "curesites" comonomers, such as-bromo and/or iodo olefins having from 2 to 10 carbon atoms (as described for example in U.S. Pat. No. 4,035,565 and U.S. Pat. No. 4,694,045), or iodo and/or bromo fluoroalkylvinylethers (as described in U.S. Pat. No. 4,745,165, U.S. Pat. No. 4,564,662 and EP 199,138), in such amounts whereby the content of "curesites" comonomers in the final product is generally in the range 0.05–2 moles for 100 moles of the other base monomeric units.

Alternatively or also in combination with the "cure-site" comonomers, it is possible to introduce in the end groups iodine and/or bromine atoms by addition to the reaction mixture of iodinated and/or brominated chain transfer agents, such as for example the compounds of formula $R_f(I)_x(Br)_y$, wherein $R_f$ is a (per)fluoroalkyl or a (per)fluorochloroalkyl having from 1 to 8 carbon atoms, while x and y are integers in the range 0–2, with $1 \leq x+y \leq 2$ (see for example U.S. Pat. No. 4,243,770 and U.S. Pat. No. 4,943,622). It is also possible to use as chain transfer agents iodides and/or bromides of alkaline or alkaline-earth metals, according to U.S. Pat. No. 5,173,553.

Preferably the crosslinking of radical type uses ionomers containing units of the bis-olefin of formula (I) and iodine in terminal position.

The sulphonic ionomer of the invention is crosslinked by radical route at a temperature in the range 100° C.–200° C., depending on the type of type used peroxide, by addition of a suitable peroxide capable to generate radicals by heating. Generally, the peroxide amount is in the range 0.1%–5% by weight with respect to the polymer. Among them it can be mentioned: dialkylperoxides, such as for example di-terbutyl-peroxide and 2,5-dimethyl-2,5-di (terbutylperoxy)hexane; dicumyl peroxide; dibenzoyl peroxide; diterbutyl perbenzoate; di-1,3-dimethyl-3-(terbutylperoxy)butylcarbonate. Other peroxidic systems are described, for example in the patent applications EP 136,596 and EP 410,351.

Besides it can be added before the crosslinking:

(a) a crosslinking co-agent, in an amount in the range 0.5–10%, preferably 1–7% by weight with respect to the polymer; among them it can be mentioned: triallylcyanurate; triallyl-isocyanurate (TAIC); tris (diallylamine)-s-triazine; triallylphosphite; N,N-diallyl-acrylamide; N,N,N',N'-tetrallyl-malonamide; trivinyl-isocyanurate; 2,4,6-trivinyl-methyltrisiloxane; N,N'bisallylbicyclo-oct-7-ene-disuccinimide (BOSA); bis olefin of formula (I), triazine;

(b) a metal compound, in amounts in the range 1–15%, preferably 2–10%, by weight with respect to the polymer, selected from oxides or hydroxides of divalent metals, such as for example Mg, Zn, Ca or Pb, optionally combined with a weak acid salt, such as for example stearates, benzoates, carbonates, oxalates or phosphites of Ba, Na, K, Pb, Ca;

(c) other conventional additives, such as thickeners, pigments, antioxidants, stabilizers and the like;

(d) inorganic or polymer reinforcing fillers, preferably optionally fibrillable PTFE. Preferably fillers have a size from 10 to 100 nm, preferably 10–60 nm.

A further object of the present invention is that the sulphonic ionomer can be mixed with a fluoroelastomer, preferably perfluoroelastomer, co-curable with the sulphonic ionomer of the invention. Preferably for the co-curing the fluoroelastomer contains iodine and/or bromine atoms. A TFE-/perfluoromethylvinylether copolymer having a ratio by moles in the range 80:20–60:40 of the type described in EP 661,304 in an amount comprised between 0–50% by weight with respect to the polymer, can for example be mentioned.

The ionomer and fluoroelastomer mixture can for example be a physical blend of solid polymers or of polymerization latexes. In this case the percentages of peroxides are to be referred to the ionomer and fluoroelastomer mixture. Also for the optional agents the percentages are to be referred to said mixture.

The crosslinking blend is prepared by using mechanical mixers.

The sulphonic fluorinated ionomers of the invention can be used for the preparation both of self-supported membranes and membranes supported on suitable support.

The self-supported membranes are obtained by subjecting the blend to a molding, extrusion or calendering process to obtain a film of the desired thickness, at a temperature lower than or equal to the temperature at which crosslinking takes place. When the film is obtained at a temperature lower than the crosslinking temperature, a thermal treatment is necessary to complete the crosslinking.

When the membranes are supported, as support, a fluorinated, preferably perfluorinated, porous material, having the desired size and thickness, can be used. In this case the sulphonic ionomer under the form of latex or of solution is crosslinked as above indicated, after being deposited on the support.

The crosslinked membranes of the invention are subjected to the activation treatment to transform the sulphonyl groups —$SO_2F$ into sulphonic groups —$SO_3H$. For example activation can be carried out in 2 steps:

salification to transform the —$SO_2F$ form into the —$SO_3K$ form;

acidification to transform the —$SO_3K$ form into the —$SO_3H$ form.

For example the salification is carried out by immersing the membrane obtained after the crosslinking reaction in an aqueous solution containing 10% by weight of KOH at a temperature in the range 60° C.–80° C. for a time higher than 2 hours. When the salification is over, the membrane is immersed into a distilled water bath at room temperature to wash the residual KOH. THe acidification is carried out for example by placing the salified membrane in an aqueous solution containing 20% by weight of HCl at room temperature for at least 2 hours.

The resulting membrane in the —$SO_3H$ form is suitable to be used in fuel cell applications.

The membranes obtained with ionomers having a low equivalent weight (lower than 750 g/eq) show a high hydration percentage. However this high hydration percentage does not compromise the substantial physical integrity of the membrane. Indeed by immersing the crosslinked membrane of the invention at 100° C. in water the membrane maintains integrity. On the contrary the uncrosslinked membranes subjected to the same treatment disintegrate or dissolve thus losing any physical integrity (see the Examples).

Apart from the preparation of membranes for fuel cells, the sulphonic ionomers of the present invention can successfully be used in the preparation of membranes used in electrochemical applications, such as for example chloro-alkali cells, lithium batteries, and electrodialysis and in reactors in which the ionomeric membrane acts as a superacid catalyst.

With the crosslinking system of the present invention, the crosslinking does not involve the sulphonyl groups —$SO_2F$ of the various polymer chains. In this way there is no reduction of the sulphonyl groups —$SO_2F$ available for the conversion into the sulphonic groups —$SO_3H$. Consequently, with the crosslinking of the present invention there is not the drawback of a reduction of the sulphonic groups with consequent increase of the equivalent weight and consequent lowering of the ionic conductivity.

After the crosslinking step, the iodine, when present, can optionally be eliminated by a thermal post-treatment. Said post-treatment is carried out at a temperature preferably in the range 200° C.–250° C., temperature at which the break of the C—I bonds takes place with consequent iodine elimination.

The polymerization of the monomers can be carried out in aqueous emulsion according to well known methods of the prior art, in the presence of radical initiators (for example alkaline or ammonium persulphates, perphosphates, perborates or percarbonates), optionally in combination with ferrous, cuprous or silver salts, or other easily oxidizable metals. In the reaction medium also surfactants of various type are usually present, among which the fluorinated surfactants of formula:

$R_f$—$X^-M^+$ are particularly preferred, wherein $R_f$ is a $C_5$–$C_{16}$ (per) fluoro-alkyl chain or a (per)fluoropolyoxyalkylene chain, $X^-$ is —$COO^-$ or —$SO_3^-$, $M^+$ is selected from: $H^+$, $NH_4^+$, alkaline metal ion. Among the most commonly used we remember: ammonium perfluoro-octanoate, (per) fluoropolyoxyalkylenes ended with one or more carboxyl groups, etc.

When the polymerization is over, the ionomer is isolated by conventional methods, such as coagulation by addition of electrolytes or by cooling.

Alternatively, the polymerization reaction can be carried out in bulk or in suspension, in an organic liquid wherein a suitable radical initiator is present, according to well known techniques.

The polymerization reaction is generally carried out at temperatures in the range 25°–120° C., under pressure up to 3 MPa.

The preparation of the sulphonic ionomers of the present invention is preferably carried out by using a dispersion or microemulsion of perfluoropolyoxyalkylenes, according to U.S. Pat. No. 4,789,717 and U.S. Pat. No. 4,864,006.

DETAILED DESCRIPTION OF THE INVENTION

The present invention will be now better illustrated by the following embodiment Examples, which have a merely indicative but not limitative purpose of the scope of the invention itself.

EXAMPLES

Characterization

Hydration Percentage

After drying the membrane is weighed and subsequently hydrated in distilled water at 100° C. for 30 minutes; then it is extracted from water, dried on the surface and weighed again.

The hydration percentage H % of the membrane is evaluated according to the following formula:

$$H\% = 100 \times (\text{hydrated weight} - \text{dried weight}) / \text{dried weight}$$

Extractable Substance Percentage

The membrane is first weighed and then placed in a solution of ethanol/water 40/60 by weight at 50° C. for 22 hours. Subsequently the solution is filtered on a Whatman 541 filter. The filtered product is dried at 80° C. and the dry residue is weighed. The percentage E % of extractable substance is determined according to the following formula:

$$E\% = 100 \times (\text{dry residue weight} / \text{initial membrane weight})$$

Release Temperature of Bound Water

The release temperature $T_r$ of the water bound to the groups —$SO_3H$ is evaluated by thermogravimetric analysis (TGA).

An amount of about 10 mg of the hydrated membrane in water, distilled at 100° C. for 30 minutes, is analyzed in a thremogravimetric analyser Perkin Elmer model TGA7. After having been maintained in $N_2$ flow at room temperature, the sample is heated with a temperature gradient of 10° C./minute up to 80° C., temperature at which it is maintained for 5 minutes. Subsequently the sample is cooled at the same rate until room temperature at which it is maintained for 10 minutes. Then the thermogravimetric analysis starts by heating the sample at a rate of 10° C./minute.

The TGA curve allows to go back to the value of the release temperature $T_r$ in correspondence of the first minimum of the derivative of the TGA curve. The higher the temperature $T_r$, the greater the capability of the membrane to keep water and consequently to lead also to high temperatures.

Example 1

In a 2 liter autoclave, the following reactants are introduced:

700 ml of demineralized water;

45 ml of the monomer of formula $$CF_2=CF-O-CF_2CF_2-SO_2F;$$

29 g of a perfluoropolyoxyalkylene microemulsion previously obtained by mixing:

11.6 g of a perfluoropolyoxyalkylene having a potassium salified acid end group of formula:

$$CF_2ClO(CF_2-CF(CF_3)O)_n(CF_2O)_mCF_2COOK$$

wherein n/m=10 having average molecular weight 527;

5.8 g of a perfluoropolyether oil Galden® D02 of formula $$CF_3O(CF_2-CF(CF_3)O)_n(CF_2O)_mCF_3$$

wherein n/m=20 having average molecular weight 450

11.6 g of water;

5.7 ml of a solution at 33% by volume of an iodinated transfer agent of formula $$I-(CF_2)_6-I$$

in a perfluoropolyether solvent Galdens® D02;

1.5 ml of a solution at 1.5% by volume of the bis-olefin of formula $$CH_2=CH-(CF_2)_6-CH=CH_2$$

in a solvent Galden® D02.

The autoclave, kept under stirring at 700 rpm, has been heated up to 50° C. 400 ml of an aqueous solution at 20 g/l concentration of potassium persulphate (KPS), are then fed to the autoclave. The pressure is brought to 3 absolute bar by introducing TFE. The reaction starts after 3 minutes. The pressure is maintained at 3 absolute bar by feeding TFE. During the polymerization, 7.5 ml of the sulphonyl monomer of formula $$CF_2=CF-O-CF_2CF_2-SO_2F$$

and 1.5 ml of a solution at 1.5% by volume of the bisolefin of formula $$CH_2=CH-(CF_2)_6-CH=CH_2$$

in a solvent Galden® D02 are added every 6.5 g of fed TFE. The total TFE mass fed to the reactor is equal to 88 g. The reaction is stopped after 280 minutes from the start, by lessening the stirring, cooling the reactor and venting the TFE. The produced latex has a solid content of 25% by weight. The latex is coagulated by freezing, the polymer is separated from the mother liquors and dried at 100° C. for 8 hours at room pressure. The copolymer composition determined by NMR results to be 69% by moles of TFE and 31% by moles of sulphonyl monomer, corresponding to an equivalent weight of 500 g/eq. The iodine content by weight in the ionomer, measured by X ray fluorescence (XRF) is 0.25%.

For the subsequent crosslinking step, 50 g of the obtained ionomer are mixed in an open mixer with 0.5 g of 2,5-dimethyl-2,5-di(terbutylperoxy)hexane (Luperox®101 XL) and with 0.5 g of TAIC Drymix® both supported on silica. 2% by weight of a mixture silica/metal oxides (Celite® 350) is furthermore added.

About 10 g of blend are molded in press at 150° C. for 20 minutes by applying a pressure of 200 bar.

A portion of the resulting film, weighing 4.90 g, is subjected to a salification treatment for 5 hours 30 minutes at 60° C. in an aqueous solution of KOH at 10% by weight. It is then washed in demineralized water and treated for the acidification for 16 h at room temperature in an aqueous solution of HCl at 20% by weight and washed again in demineralized water. The previous salification and acidification treatment implies the complete transformation, within the limits detectable by the FTIR analysis, of the —$SO_2F$ groups into sulphonic groups —$SO_3H$.

The so obtained ionomeric membrane is dried for 2 hours at 110° C. At the end the membrane has a weight of 4.81 g corresponding to 2% of weight loss with respect to the initial film. The membrane has physical integrity also after immersing it in water at 100° C.

The extractable substance percentage E % is 22%. This measure is repeated a second time confirming the same value.

The release temperature $T_r$ of the water bound to the —$SO_3H$ groups is 164° C.

Example 2

50 g of the ionomer obtained as in Example 1 are mixed in an open mixer with 2.7 g of a perfluoroelastomer copolymer TFE/perfluoromethylvinylether (MVE 32% by moles, bis-olefin of Example 1 0.08% by moles, iodine 0.32% by weight). Luperox® and TAIC both supported on silica are incorporated in the blend in an amount equal to 1.2% and 2% by weight with respect to the total amount of ionomer+ perfluoroelastomer. Celite® 350 is added in an amount equal to 1.2% by weight. About 10 g of blend are molded in press at 150° C. for 20 minutes applying a pressure of 200 bar. A rectangle of the resulting film, having 3.6 cm×4.2 cm sides, weight 0.48 g and thickness 150 μm, is salified for 2 hours 40 minutes at 65° C. in an aqueous solution of KOH at 10% by weight, and then washed in demineralized water. Then the film is acidified for 23 hours at room temperature in an aqueous solution of HCl at 20% by weight and at last washed in demineralized water. The activation treatment implies the complete transformation of the —$SO_2F$ groups into sulphonic groups —$SO_3H$.

The obtained membrane is hydrated at 100° C. for 30 minutes and then dried for 2 hours at 110° C. At the end the membrane has a weight of 0.43 g, corresponding to 10% of weight loss with respect to the initial film.

Example 3

50 g of the ionomer obtained as in Example 1 have been mixed in an open mixer with 8.8 g of the perfluoroelastomer of Example 2.

Luperox® and TAIC both supported on silica are incorporated in the blend in an amount equal to 1.2% and 2% by weight with respect to the total amount of ionomer+perfluoroelastomer. Celite® 350 is added in an amount equal to 1.2% by weight.

About 10 g of blend are molded in press at 150° C. for 20 minutes applying a pressure of 200 bar. A rectangle of the resulting film, having 3.8 cm×4.4 cm sides, weight 0.49 g and thickness 140 $\mu$m, is salified for 2 hours at 65° C. in an aqueous solution of KOH at 10% by weight, and washed in demineralized water. It is then acidified for 2 hours and 30 minutes at room temperature in an aqueous solution of HCl at 20% by weight and at last washed in demineralized water. The previous activation treatment implies the complete transformation of the —$SO_2F$ groups into sulphonic groups —$SO_3H$.

The obtained membrane is hydrated at 100° C. for 30 minutes and then dried for 2 hours at 110° C. At the end the membrane has a weight of 0.46 g, corresponding to 6% of weight loss with respect to the initial membrane. The membrane has physical integrity also after immersing it in water at 100° C.

The extractable substance percentage E % is 15%.

The release temperature $T_r$ of the water bound to the —$SO_3H$ groups is 169° C.

Example 4

50 g of the ionomer obtained as in Example 1 have been mixed in an open mixer with 16.7 g of the perfluoroelastomer of Example 2.

Luperox® and TAIC both supported on silica are incorporated in the blend in an amount equal to 1.2% and 2% by weight with respect to the total amount of ionomer+perfluoroelastomer. Celite® 350 is added in an amount equal to 1.2% by weight.

About 10 g of blend have been molded in press at 150° C. for 20 minutes applying a pressure of 200 bar. A rectangle of the resulting film, having 3.8 cm×4.0 cm sides, weight 0.55 g and thickness 170 $\mu$m, is salified for 2 hours at 65° C. in an aqueous solution of KOH at 10% by weight, and washed in demineralized water. The film is then acidified for 1 hours 40 minutes at room temperature in an aqueous solution of HCl at 20% by weight and at last washed in demineralized water.

The previous activation treatment implies the complete transformation of the —$SO_2F$ groups into acid sulphonic groups.

The obtained membrane is hydrated at 100° C. for 30 minutes and then dried for 2 hours at 110° C. At the end the membrane has a weight of 0.52 g, corresponding to 5% of weight loss with respect to the initial film. The membrane has physical integrity also after immersing it in water at 100° C.

The extractable substance percentage E % is 4%.

The release temperature $T_r$ of the water bound to the —$SO_3H$ groups is 140° C.

Example 5

About 10 g of the blend containing the same ionomer and the same components of Example 4 have been molded in press at 150° C. for 20 minutes by applying a pressure of 200 bar. A rectangle of the resulting film, having 6.1 cm×9.3 cm sides, weight 2.18 g and thickness 180 $\mu$m, is salified for 5 hours at 65° C. in an aqueous solution of KOH at 10% by weight, and washed in demineralized water. The film is subsequently acidified for 17 hours at room temperature in an aqueous solution of HCl at 20% by weight and at last washed in demineralized water.

The obtained membrane is hydrated at 80° C. for 30 minutes. After hydration it results to have a thickness of about 320 $\mu$m. It is placed in a test fuel cell, fed at the anode with hydrogen at 3.5 bar and fed at the cathode with air at 4 bar. At a temperature of 70° C., the current corresponding to a voltage of 0.7 V is of 500 mA/cm$^2$. The slope of the straight portion of the voltage-current curve (resistance) is of R=0.425 ohm cm$^2$. The thickness of the hydrated membrane being known, this resistance value allows to determine a conductivity value for the membrane of 7.5×10$^{-2}$ S/cm.

Example 6

About 10 g of the blend containing the same ionomer and the same components of Example 4 have been molded in press at 150° C. for 20 minutes, applying a pressure of 200 bar. The resulting film has been treated in a stove for 22 hours at 230° C. After this treatment iodine is no longer detectable by the XRF analysis. A rectangle of the so treated film, having 5.1 cm×5.9 cm sides, weight 1.00 g and thickness 150 $\mu$m, is salified for 3.5 hours at 65° C. in an aqueous solution of KOH at 10% by weight, and washed in demineralized water. The film is subsequently acidified for 10 hours at room temperature in an aqueous solution of HCl at 20% by weight and at last washed in demineralized water.

The obtained membrane is hydrated at 80° C. for 30 minutes. After hydration it results to have a thickness of about 270 $\mu$m. It is placed in a test fuel cell, fed at the anode with hydrogen at 3.5 bar and fed at the catode with air at 4 bar. At a temperature of 70° C., the current corresponding to a voltage of 0.7 V is of 580 mA/cm$^2$. The slope of the straight portion of the voltage-current curve (resistance) is of R=0.313 ohm cm$^2$. The thickness of the hydrated membrane being known, this resistance value allows to determine a conductivity value for the membrane of 8.6×10$^{-2}$ S/cm.

Example 7

Comparative

About 10 g of the ionomer of Example 1 are molded in press at 80° C. for 5 minutes, applying a pressure of 200 bar. A rectangle of the resulting film, weighing 2.2 g and having a thickness of 220 $\mu$m, is salified for 4 hours at 65° C. in an aqueous solution of KOH at 10% by weight, and washed in demineralized water, then acidified for 8 hours at room temperature in an aqueous solution of HCl at 20% by weight and at last washed in demineralized water. The obtained membrane immersed in water and brought to 50° C., completely dissolves.

The results of the Examples show that the crosslinked membranes of the present invention under the form of —$SO_3H$ show physical integrity even after immersion in water at 100° C. according to the test indicated in the Examples.

What is claimed is:

1. Crosslinked sulphonic fluorinated ionomers, where crosslinking does not involve the —$SO_2F$ groups, having an equivalent weight 380–1,300 g/eq, comprising:
   (A) monomeric units deriving from one or more fluorinated monomers containing at least one ethylene unsaturation;

(B) fluorinated monomeric units containing sulphonyl groups —SO$_2$F in an amount such as to give the above indicated equivalent weight.

2. Fluorinated ionomers according to claim 1, wherein the fluorinated monomers of type (A) are selected from:
vinylidene fluoride (VDF);
C$_2$–C$_8$ perfluoroolefins;
C$_2$–C$_8$ chloro- and/or bromo- and/or iodo-fluoroolefins;
(per) fluoroalkylvinylethers (PAVE) CF$_2$=CFOR$_f$, wherein R$_f$ is a C$_1$–C$_6$ (per) fluoroalkyl;
perfluoro-oxyalkylvinylethers CF$_2$=CFOX, wherein X is a C$_1$–C$_{12}$ perfluoro-oxyalkyl having one or more ether groups.

3. Fluorinated ionomers as claimed in claim 2, wherein the perfluoroolefin is a tetrafluoroethylene (TFE), the chloro- and/or bromo- and/or iodoflujoroolefins are selected from the group consisting of chlorotrifluoroethylene (CTFE) and bromotrifluoroethylene, the (per) fluoroalkyl is selected from the group consisting of trifluoromethyl, bromodifluoromethyl and pentafluoropropyl, the ether group is perfluoro-2-propoxy propyl.

4. Fluorinated ionomers according to claim 1, wherein the fluorinated monomers of type (B) are selected from one or more of the following:

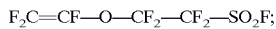

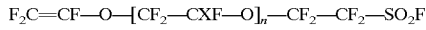

wherein X=Cl, F or CF$_3$; n=1–10

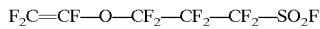

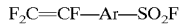

wherein Ar is an aryl ring.

5. Fluorinated ionomers according to claim 1, optionally containing from 0.01 to 0.4% by moles of monomeric units deriving from a bis-olefin of formula:

wherein:
m=2–10;
R$_1$, R$_2$, R$_5$, R$_6$, equal to or different from each other, are H or C$_1$–C$_5$ alkyl groups.

6. Fluorinated ionomers according to claim 5, wherein the ionomer before crosslinking comprises:
monomeric units deriving from TFE;
monomeric units deriving from

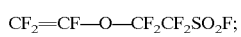

monomeric units deriving from the bis-olefin of formula (I).

iodine atoms in terminal position.

7. Fluorinated ionomers according to claim 1, wherein the ionomer before crosslinking contains in the chain and/or in the terminal position radical attack sites.

8. Fluorinated ionomers as claimed in claim 7, wherein the radical attack sites are selected from the group consisting of iodine atoms and bromine atoms.

9. Fluorinated ionomers according to claim 1, wherein said fluorinated ionomers are produced by a method comprising crosslinking monomeric units from group (A) and fluorinated monomeric units from group (B), wherein said crosslinking is performed by radical route and takes place at a temperature in the range 100° C.–200° C. in the presence of peroxide in an amount in the range of 0.1%–5% by weight with respect to the polymer.

10. Fluorinated ionomers according to claim 1, wherein before crosslinking the following compounds are added:
(a) a crosslinking co-agent, in an amount in the range 0.5–10% with respect to the polymer;
(b) a metal compound, in amounts in the range 1–15% by weight with respect to the polymer, selected from oxides or hydroxides of divalent metals;
(c) other conventional additives;
(d) inorganic or polymer reinforcing fillers.

11. Fluorinated ionomers as claimed in claim 10 wherein:
a) the crosslinking co-agent is selected from the group consisting of triallyl-cyanurate, triallyl-isocyanurate (TAIC), tris(diallylamine)-s-triazine, triallylphosphite, N,N-diallyl-acrylamide, N,N,N',N'-tetrallyl-malonamide, trivinyl-isocyanurate, 2,4,6-trivinyl-methyltrisiloxane, N,N'bis-allylbicyclo-oct-7-ene-disuccinimide (BOSA) and triazine;
b) the divalent metal is selected from the group consisting of Mg, Zn, Ca and Pb;
(c) the other conventional additives are selected from the group consisting of thickeners, pigments, antioxidants and stabilizers.

12. Fluorinated ionomers according to claim 1, wherein before crosslinking the ionomer is mixed with a fluoroelastomer co-curable with said fluorinated ionomers.

13. Fluorinated ionomers according to claim 12, wherein the fluoroelastomer contains iodine and/or bromine atoms.

14. Membranes obtainable from the fluorinated ionomers of claim 1.

15. Membranes according to claim 14 self-supported or supported on a support.

16. Membranes according to claim 14, wherein the membranes are prepared by a process comprising subjecting the membranes to an activation treatment to transform the sulphonyl groups —SO$_2$F into sulphonic groups —SO$_3$H.

17. A fuel cell comprising at least one membrane according to claim 16.

* * * * *